Patented June 24, 1941

2,246,924

UNITED STATES PATENT OFFICE 2,246,924

ARYL-AMINO ALKENYL PHENOLS

Philip T. Paul, Naugatuck, Conn., assignor to United States Rubber Company, New York, N. Y., a corporation of New Jersey No Drawing. Application June 28, 1939, Serial No. 281,529

8 Claims. (Cl. 260—571)

The present invention relates to new chemicals, referred to as aryl-amino alkenyl phenols.

They are definite chemical entities and are believed to have the general formula

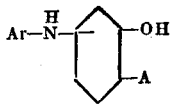

where N is nitrogen; H is hydrogen; O is oxygen; Ar refers to an aryl nucleus of the benzene, naphthalene or biphenyl series; A is an alkenyl group.

The aryl nucleus may also contain substituents such as halogen, hydroxy, alkyl, aryl, amino, secondary alkyl amino, tertiary alkyl amino, alkenyloxy, anilino, mercapto, tertiary aryl amino, alkoxy, etc.

Illustrative of such compounds are the following:

2-allyl 4-anilino phenol
2-methallyl 4-anilino phenol
2-methallyl 5-anilino phenol
2-allyl 6-anilino phenol
3-allyl 4-anilino phenol
2-allyl 4-naphthylamino phenol
2-allyl 4-tolylamino phenol
2-allyl 4-xenylamino phenol
2-methallyl 4-((p-anilino) anilino) phenol
2-propenyl 4-anilino phenol
3-isobutenyl 4-anilino phenol
3-propenyl 4-naphthylamino phenol
2-isobutenyl 4-xenylamino phenol
4-butenyl 3-anilino phenol
2-isobutenyl 4-anilino phenol
2-vinyl 4-anilino phenol
3-vinyl 4-naphthylamino phenol
4-vinyl 3-anilino phenol The chemicals may be prepared by heating a C-alkenyl oxy-substituted diarylamine at an elevated temperature, the following examples being given as illustration:

EXAMPLE I.—*Preparation of 2-allyl 4-anilino phenol*

4-allyloxy diphenylamine (25 grams) was heated for 7 minutes in a bath held at 240–250° C. During the heating, a vigorous reaction occurred as evidenced by the fact that the temperature of the 4-allyloxy diphenylamine rose to 285° C. The material was then vacuum distilled and the fraction boiling at 175–185° C. at 3 mm. was collected. On standing over night it crystallized. The 2-allyl 4-anilino phenol was purified by recrystallization from a benzene-ligroin mixture.

*Analysis*

| | |
|---|---|
| Melting point ° C__ | 81–82 |
| Nitrogen: | |
| Theory per cent__ | 6.23 |
| Found do____ | 6.23 |

EXAMPLE II.—*Preparation of 2-methallyl 4-anilino phenol*

4-methallyloxy diphenylamine was heated over night at 212° C. in a sealed tube. The tube was opened and the contents dissolved in benzene and washed with 30% potassium hydroxide. Acidification of the alkaline extract yielded the 2-methallyl 4-anilino phenol M. P. 100–102° C.

*Analysis*

| Nitrogen: | Per cent |
|---|---|
| Theory | 5.86 |
| Found | 6.02 |

The alkenyloxy diarylamine may be first prepared by reacting a C-hydroxy diarylamine with an alkenyl chloride.

The present chemicals may be used for various purposes, for example, as insecticides, pharmaceuticals, intermediates for the preparation of other chemicals, high pressure lubricants, gasoline inhibitors, rubber antioxidants, etc. For example, it has been found that 2-allyl 4-anilino phenol is an excellent rubber antioxidant. To a portion of rubber master batch having the composition (parts are by weight):

| | |
|---|---|
| Smoked sheets | 100. |
| Carbon black | 47. |
| Zinc oxide | 5. |
| Pine tar | 3.50 |
| Zinc salt of cocoanut oil fatty acids | 3.50 |
| Sulfur | 3.00 |
| Mercaptobenzothiazole | 1.00 |
| | 163.00 |

1 part of 2-allyl 4-anilino phenol was added. Cures were made for 45, 60, 75 and 90 minutes at 30 pounds steam. The percent remaining tensile before and after aging under 300 pounds oxygen at 70° C. is as follows:

| | Blank | Antioxidant stock |
|---|---|---|
| Unaged | 100 | 100 |
| Aged | 48 | 62 |

Where the term "rubber" is used herein it is to be construed broadly as including caoutchouc, balata, gutta percha, and similar vulcanizable gums, as well as synthetic rubbers, rubber isomers, reclaimed rubber, etc. and natural or artificially-prepared latices.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the antioxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. An aryl-amino alkenyl monohydric phenol of the benzene series in which the alkenyl and hydroxy group are attached to the same benzene nucleus.

2. An aryl-amino 2-alkenyl monohydric phenol of the benzene series in which the alkenyl and hydroxy group are attached to the same benzene nucleus.

3. An aryl-amino 3-alkenyl monohydric phenol of the benzene series in which the alkenyl and hydroxy group are attached to the same benzene nucleus.

4. An aryl-amino monohydric phenol of the benzene series having an allyl group ortho to the hydroxy group.

5. An anilino monohydric phenol of the benzene series having an allyl group ortho to the hydroxy group.

6. A compound which is a monohydric phenol of the benzene series having separately attached to the same benzene nucleus an alkenyl group and an aryl-amino group.

7. 2-allyl-4-anilino phenol.

8. 2-methallyl 4-anilino phenol.

PHILIP T. PAUL.